United States Patent [19]

Fong

[11] Patent Number: 4,969,419
[45] Date of Patent: Nov. 13, 1990

[54] DEVICE FOR COLLECTING ANIMAL EXCREMENT

[76] Inventor: Eva Fong, 65 Ridings Way, Ambler, Pa. 19002

[21] Appl. No.: 503,718

[22] Filed: Apr. 3, 1990

[51] Int. Cl.$^5$ ............................................. A01K 23/00
[52] U.S. Cl. ........................................ 119/95; 119/29
[58] Field of Search ............... 119/95, 29, 96; 604/54, 604/345, 327; D30/165

[56] References Cited

U.S. PATENT DOCUMENTS

| | | |
|---|---|---|
| 1,175,773 | 3/1916 | Khoubesserian ........................ 119/95 |
| 3,656,459 | 4/1972 | Missud ..................................... 119/95 |
| 3,786,787 | 1/1974 | Weinberger ............................. 119/95 |
| 3,792,687 | 2/1974 | Ehrman ................................... 119/95 |
| 3,817,217 | 6/1974 | Matuka et al. ......................... 119/95 |
| 4,103,645 | 8/1978 | Tyler ...................................... 119/95 |
| 4,182,331 | 1/1980 | Rodriguez .............................. 128/271 |
| 4,269,148 | 5/1981 | Holley-Donawa ................... 119/95 |
| 4,444,152 | 4/1984 | Berardo .................................. 119/95 |
| 4,510,887 | 4/1985 | Lincoln et al. ......................... 119/95 |
| 4,537,153 | 8/1985 | Vidal ....................................... 119/95 |
| 4,709,661 | 12/1987 | Mayle .................................... 119/95 |
| 4,779,573 | 10/1988 | Vidal ...................................... 119/95 |
| 4,893,587 | 1/1990 | Bailey .................................... 119/95 |
| 4,907,541 | 3/1990 | Thompson ............................. 119/96 |

FOREIGN PATENT DOCUMENTS

| | | |
|---|---|---|
| 686959 | 5/1964 | Canada ................................... 119/29 |
| 2477370 | 9/1981 | France ................................... 119/95 |

*Primary Examiner*—John Weiss
*Attorney, Agent, or Firm*—Dann, Dorfman, Herrell and Skillman

[57] ABSTRACT

An appliance for collecting animal excrement in which a harness is fitted on the trunk of a dog for holding a collector in a position transversely across the rear of the dog below the base of the tail and the anal opening. The harness has an extension extending along the tail and terminating in a top fastener spaced outwardly from the base of the tail. The collector has a top opening with a pair of tab elements adapted to be connected together and engaged with said top fastener on the top surface of the tail. The harness has side members with side fasteners at opposite sides of the dog which are used to position the collector snugly against the rear of the dog below the anal opening. The top opening of the collector is closed when the tail is lowered and is opened when the tail is raised to a normal defecating position. The illustrated harness has loops adapted to encircle the four legs of the dog and a ring providing a site for attaching a leash to the harness. The fasteners comprise spring clips mounted for adjustment to properly position the collector. The collector comprises a tubular envelope having at the bottom end a straight bottom transverse seam, and at the top end a transverse first cut extending only partially across said tubular envelope and a second cut extending across the full width of said envelope above said partial cut in a straight line parallel to said bottom seam to form the tab elements.

11 Claims, 2 Drawing Sheets

DEVICE FOR COLLECTING ANIMAL EXCREMENT

FIELD OF THE INVENTION

The present invention relates to appliances for small animals and has particular application to a device for collecting animal excrement.

BACKGROUND OF THE INVENTION

In testing of drugs, canines are frequently used in the testing program for determining dosage and efficacy. In such programs, the intake of the test animal is carefully controlled, and the excrement is measured and analyzed to determine the retention and/or absorption of the drug by the digestive system of the animal. The collection of all of the animal excrement from the laboratory cages often is not possible, and quantative measurements are thus not reliable.

Furthermore particularly during a animal pet's early years, it is frequently necessary to provide specimens of fecal matter to the veterinarian in order to test the animal for worms or other animal problems, and the collection of the fecal matter and transport of it to the veterinarian is inconvenient at the least and distasteful in many cases.

In urban areas, it is desirable to avoid fouling the pedestrian areas with animal excrement, and in many areas it is illegal to leave animal excrement in or adjacent public walkways. Accordingly, many devices have been developed for picking up animal excrement so that it may be disposed of in suitable receptacles.

In addition to the aforementioned problems of collecting and/or disposing of animal excrements, it is frequently necessary to confine household pets to kennel areas when they are ill or untrained, so as to avoid damage to the household by their defecating in the living areas of the house. It would be desirable to have an effective appliance for entrapping the pet's droppings, to avoid the necessity of confining the pet to a kennel.

In order to solve these problems, various devices have been invented for fitting onto an animal in the nature of a diaper or other device which is designed to entrap the animal excrement and avoid damage to the household. In most cases, the presence of the attachment is a discomfort to the animal and the animal tries to dislodge the attachment so as to avoid the discomfort.

SUMMARY OF THE INVENTION

The present invention provides a novel device for collecting animal excrement which is not possessed of the disadvantages of the prior art devices and which is easily attached to the animal and which does not cause substantial discomfort to the animal when attached.

More specifically, the present invention provides a harness arrangement which is easy to mount on the animal and causes relatively little discomfort without need for obstructing the rear parts of the animal with straps or other attachments. The harness is sufficiently simple in construction and arrangement as to be suitable for leaving in place on the animal in periods when collection of excrement is not necessary so that when it is necessary, a collecting bag may be attached to the harness and the collecting bag is positioned so as to be effective to collect the excrement as the animal defecates.

More specifically, the present invention provides a harness which enables the use of a disposable flexible bag which may be attached to the animal and which has an opening which may be positioned away from the anal area when the dog is walking or exercising, and which automatically positions itself with an opening in registry with the anal opening of the dog only when the dog raises its tail as in the normal defecating position.

This objective of the invention is obtained by providing a disposable bag having a flexible margin along its open end which may be snugly engaged with the rear parts of the dog below the anal opening and has tab elements arranged to be connected with the harness over the tail of the dog, so that when the dog lifts its tail for defecation, the tail opens the receptacle bag to put the open top of the bag into registry with the anal opening to collect the fecal matter as the dog defecates.

In particular, the present invention provides a novel collection device having in combination a harness with a central strap overlying the backbone of the animal and having an extension adapted to overlie the tail of the animal beyond its base, terminating in a fastener, along with a flexible collection bag having an open top with one portion to be snugly engaged against the rear parts of the animal below the anal opening and the remaining part of the opening forming a loop having tabs adapted to engage the fastener above the tail.

BRIEF DESCRIPTION OF THE DRAWINGS

All of the objects of the invention are more fully set forth herein after with reference to the accompanying drawings, wherein.

DESCRIPTION OF THE PREFERRED EMBODIMENT

Figure 1:
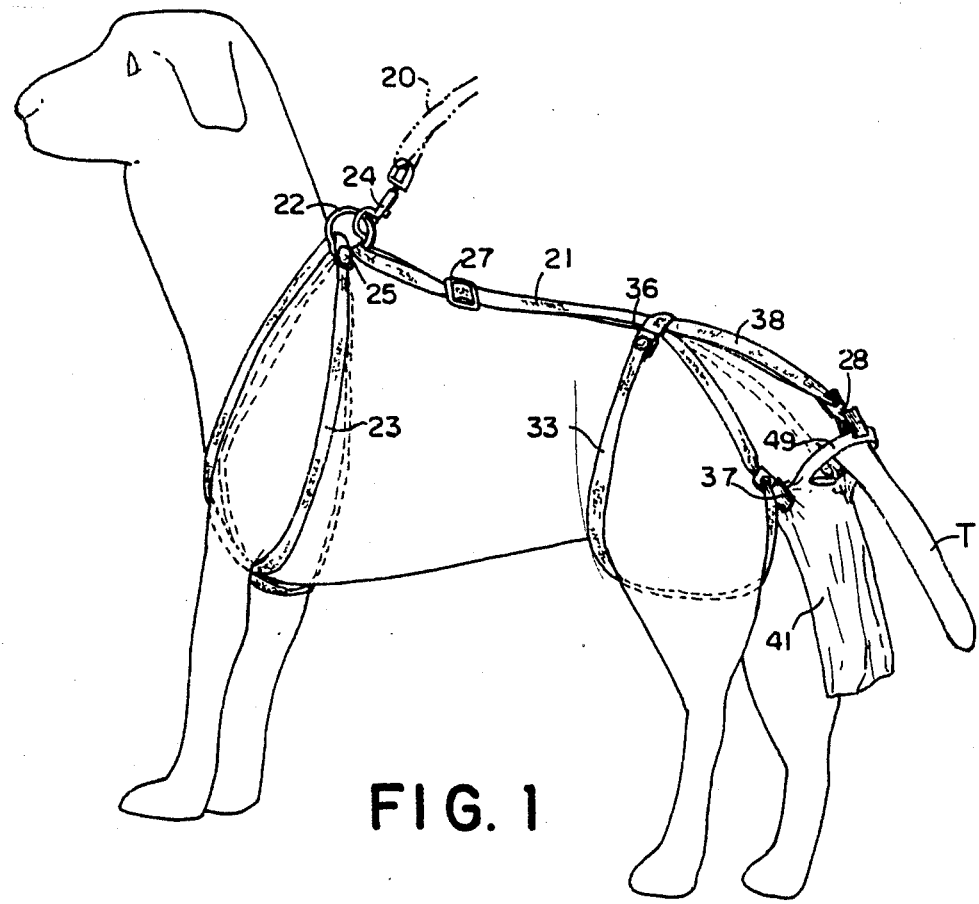
FIG. 1 is a view of a device embodying the present invention positioned on a dog showing the tail lowered as is the case when the dog is walking or engaging in normal exercise.

Referring now to the drawings, the illustrated embodiment of the invention comprises a harness adapted to extend along the entire length of the dog and has loops at the forward and rearward end which may encircle the forelegs and the rear legs of the dog to position the harness centrally along the back of the dog generally in registry with the backbone of the dog.

Figure 4:
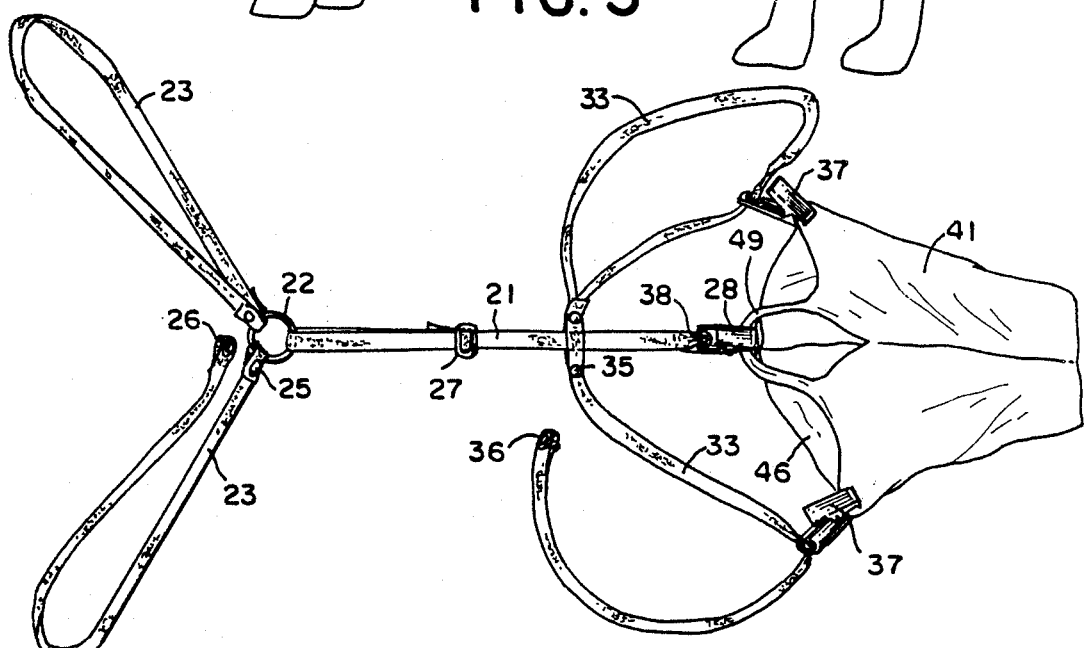
FIG. 4 is a view of the device removed from the dog showing the component parts thereof.

Referring to the figures, the harness comprises a central strap 21 terminating at its forward end in a ring 22 to which are connected foreleg loops 23,23 and a snap fastener 24 which may be connected to a leash indicated in broken lines at 20. As shown in FIG. 4, the foreleg loops 23,23 are connected to the ring 22 by a collet 25 which serves as one element of a snap fastener, the other fastener element 26 being attached to the free end of the strap so that the loop 23 is completed when the fastener 26 is connected to the collet 25. The engagement of the fastener 26 with the collet at 25 enables the harness to be easily mounted on the dog by simply disconnecting the fastener and drawing the free end of the loop under the dog's belly between its legs and back to the collet at 25.

The strap 21 is adjustable in length through a buckle 27 so as to be accommodated to different types and sizes of dogs. Preferably, the buckle 27 is adjusted so that when the strap 21 is pulled taut rearwardly to draw the loops 23 snugly against the dog's chest, the terminal end of the strap which has a clip fastener 28 is positioned along the tail beyond the base of the tail at the end of the backbone of the dog, as shown in FIG. 1. Adjacent the rear end, the strap 21 is held in position along the backbone of the dog by rear leg loops 33,33 which, like the loops 23, have free ends 36 with snap fasteners engageable with fittings 35 which are adjustable along the length of the strap 21, as best shown in FIG. 4. As illustrated in FIG. 1, the rear loops 33, snugly engage the right and left haunches of the dog and position the strap 21 overlying the dog's backbone. The loops 33 may be adjusted forwardly and rearwardly to assure a snug fit of the harness upon the dog.

As shown, the strap 21 has a rearward extension 38 which overlies the base of the tail and extends along the tail to the fastener 28. As mentioned above, the extension 38 terminates in a clip fastener 28 which overlies the tail outwardly from its base. Similar clip fasteners 37,37 are provided on each of the rear leg loops 35 and, as described below, the fasteners 37 and 37 cooperate with the fastener 28 to clip a collector receptacle 41 in place across the rear parts of the dog. As shown, the clips 37 are adjustable along the loops 33 so that a receptacle, when stretched between the clips 37,37 across the rear of the animals, has its upper edge positioned below the anal opening of the animal.

Figure 2:
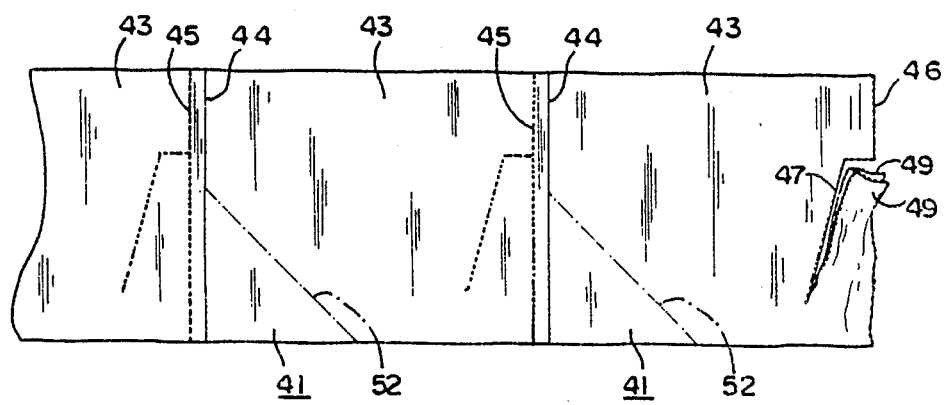
FIG. 2 is a view showing a string of collection bags prior to being separated for placing them in engagement with the harness.

FIG. 2 illustrates a string of collectors 41. As shown, the each collector comprises a tubular envelope 43 having a seam 44 extending in a straight line transverse to the longitudinal direction of the tubular member so as to providse a bottom closure for the envelope. The envelope is separated from the string by a tear line 45 parallel to the seam 44 just beyond the seam. The envelope 43 is cut off from the string of envelopes by a tear line 45 which extends straight across the envelope parallel to the straight seam line 44. The tear line 45 provides a top edge 46 for the next bag.

The bag 41 shown in FIG. 2 has its top edge 46 extending across the width as shown. The bag 41 in the string is formed of a flexible film such as used for food storage bags and the like. The top edge 46 of the bag has a transverse cut 47 which extends only partially across the envelope. Between the cut 47 and the top edge 46 is formed a tab element 49. In the present instance, the cut 47 is made on both surfaces of the envelope 43 so as to provide a pair of tab elements 49,49. The upper part of the top edge 46 intersects the cut 47 to produce a free edge which forms a top opening for the collector envelope 43. The free edge formed by the cut segments 46 and 47 terminate in the tab elements 49 which are used to secure the collector element to the harness at the top of the tail. If desired, the closed end of the bag may be tapered by a seam, as indicated at 52, to reduce the bulkiness of the collector receptacle 41.

In operation, the free edge formed by the cut 47 is stretched across the rear of the animal below the anal opening. The central part of the rear edge is clipped to the clips 37 on opposite sides of the animal so that the central part of the free edge is snugly engaged against the rear parts of the animal below the anal opening. The remaining parts of the free edge extend out from the harness clips 37 and complete the top opening of the receptacle 41 by connecting the tab elements 49 to each other on the top of the tail and engaging them in the clip fastener 28. As shown in FIG. 1, when the tail T of the animal is in its normal lowered position, the clip 28 hangs down below the anal opening so that when the tab elements 49 are engaged by the clip, they do not cause the bag to overlie the anal opening and do not cause substantial discomfort to the animal. The clip prevents the tabs from falling down beyond the end of the tail and thereby retain the tabs engaged over the tail T of the animal.

Figure 3:
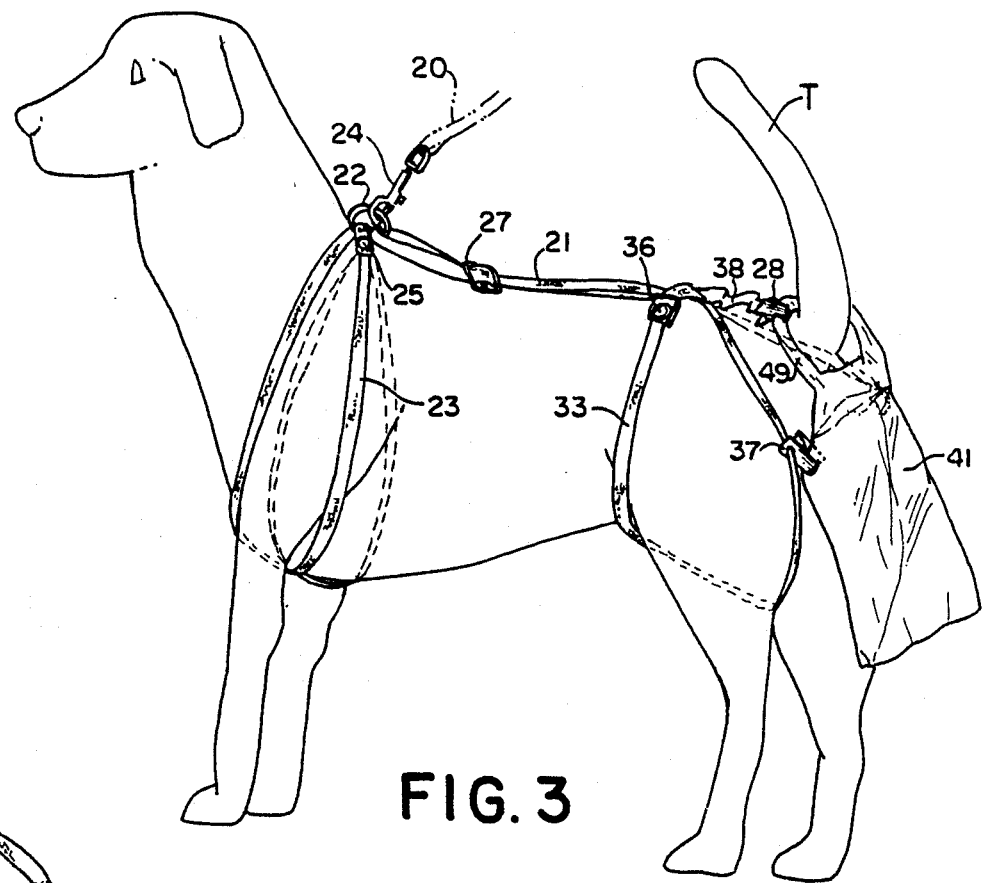
FIG. 3 is a view similar to FIG. 1 showing the tail of the dog elevated in a position to cause the collection bag to open and position the opening thereof in registry with the anal opening of the dog.

As shown in FIG. 3, when the dog defecates, it normally raises its tail, and the raising of the tail, in turn, causes the tabs to be raised so as to position the opening of the collector in registry with the anal opening so as to catch the animal droppings as the animal defecates. When the animal defecates, the excrement falls directly into the container 41. When finished, the dog lowers its tail to cause the top opening of the receptacle to be closed below the anal opening. At an appropriate time, the container may be simply unclipped from the clips 37 and 28 and the entrapped excrement may be disposed of in any suitable fashion or the container may be used to transport the specimen of fecal matter to the veterinarian for examination.

It is noted that since the cut 47 intersects the end cut 46, the tabs 49 are separated at their free ends. If the cut 47 does not intersect the end cut 46, but rather is extended through the side edge of the envelope, the tabs 49 will be intereconnected at the edge and it would not be necessary to tie the tabs together, but, rather, the tail may be simply slipped in between the tabs to position the interconnected tabs in the clip 28 above the tail.

The harness may be modified to be adapted to any particular type of animal. For example, if the loops around the legs cause discomfort to the animal, the loops may be fitted around the body of the animal or around its neck so as to position the central strap overlying the back of the animal with the extension overlying the tail.

While a particular embodiment of the present invention has been herein illustrated and described, it is not intended to limit the invention to limit the invention to such disclosure but changes and modifications may be made therein and thereto within the scope of the following claims.

I claim:

1. A device for collecting animal excrement comprising in combination:
    a harness constructed to be mounted on the trunk of an animal with at least one central strap extending longitudinally along the backbone of the animal, at least one pair of side members arranged to engage opposite legs of the animal to retain said central strap in position overlying the backbone of the animal adjacent the tail, and an extension of said central strap extending longitudinally beyond the base of the tail along the tail and terminating in a top fastener spaced from the base of the tail;
    a collector comprising a tubular envelope having a top opening along the upper margin of said collector, said envelope having a transverse first cut extending only partially across both sides of said tubular envelope producing an elongated free edge on the lowerside of said cut defining said opening, and producing a pair of tab elements on the upper side of said cuts at the opposite ends of the free edge, said tab elements adapted to be connected together to complete a closed loop adjacent said top opening;

the upper margin of said collector being flexible so that a central portion of said free edge between said tab elements may conform to the body contour of the rear parts of the animal transversely of the backbone below the base of the tail and the anal opening;

the lower end of said tubular element being closed by a transverse bottom seam to form a bottom closure for said collector; and side fasteners interconnecting the opposite ends of said central portion to said side members at opposite sides of the animal, so as to position said central portion snugly against the rear parts of the animal below the anal opening;

said tabs being interconnected with each other and engaged with said top fastener on the top surface of the tail, the portion of said free edge remaining between said central portion and said tabs respectively closing against said central portion when the tail is lowered and opening away from said central portion when the tail is raised to a normal defecating position.

2. A device according to claim 1 wherein said central strap extends forwardly toward the forelegs of the animal and terminates at its forward end in side loops adapted to encircle the forelegs of the animal adjacent its chest.

3. A device according to claim 2 including means to adjust the length of said central strap to enable said loops to be drawn snugly against the animal's chest to firmly position the harness on the animal's trunk.

4. A device according to claim 3 including a ring interconnecting said side loops with said central strap at its forward terminus, said ring providing a site for attaching a leash to the harness.

5. A device according to claim 1 wherein said side members include rear leg loops adapted to encircle the rear legs of the animal adjacent its haunches, said loops being connected to said central strap to afford adjustment of the position of said loops relative to the base of the tail.

6. A device according to claim 5 wherein said side fasteners comprise spring clips mounted on said rear leg loops for adjustment to properly position the central portion of said free edge of the collector.

7. A device according to claim 1 wherein the side members each comprise a flexible side strap forming a loop adapted to encircle the upper region of each leg of the animal, said straps being attached to said center strap and extending away from said center strap and terminating in a free end with a releasible fastener for securing the free end to the associated side strap adjacent said center strap to form a loop to encircle a leg.

8. A device according to claim 1 wherein said tubular envelope has a second cut extending across the full width of said envelope above said partial cut, said tab elements being defined between said first and second cuts.

9. A device according to claim 8 wherein said bottom seam is a straight line, and said second cut is a straight line parallel to said seam.

10. A device according to claim 9 wherein said first cut intersects said second cut on both sides of the envelope and extends from the intersection to produce two segments sustantially parallel to said second cut, and terminates short of the longitudinal edge of said envelope.

11. A device according to claim 1 including an angular seam extending from said bottom transverse seam to one longitudinal edge of the envelope to provide a tapered closed end in the collector.

* * * * *